Feb. 20, 1951 E. A. WOLD 2,542,172
PIPE HANGER
Filed Dec. 11, 1947
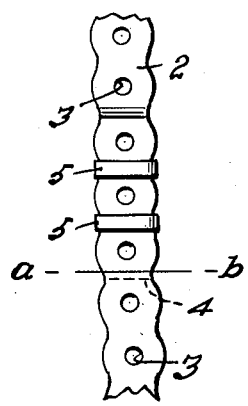
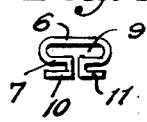
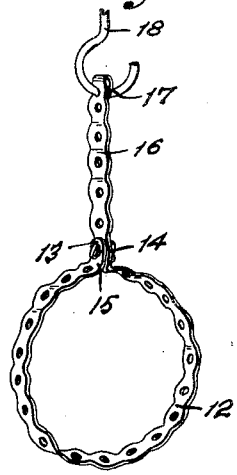
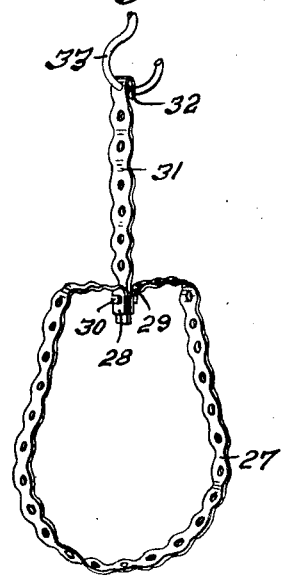
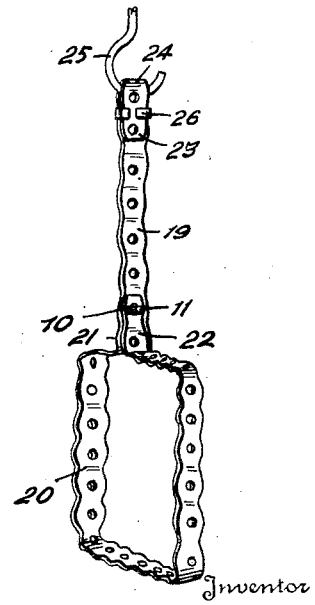
Inventor
Erling A. Wold
By *[signature]*
Attorney Patented Feb. 20, 1951

2,542,172

UNITED STATES PATENT OFFICE 2,542,172

PIPE HANGER

Erling Andreas Wold, Oslo, Norway

Application December 11, 1947, Serial No. 791,011
In Norway November 10, 1945

Section 1, Public Law 690, August 8, 1946
Patent expires November 10, 1965

1 Claim. (Cl. 248—60)

The present invention relates to a band of plate material. By plate material in this connection is chiefly meant a material of relatively rigid construction, as, for example, a metal band of iron, steel, brass, or copper, but, according to the invention, also other kinds of band material may be used, made of some suitable material, as, for instance, hardened rubber or caoutchouc, or the like.

According to the invention the band is particularly suitable for the tying together of parts in order to make suspension-brackets for tubings or ducts, for the securing of suspension-ceilings, or the like. The object of the invention is to provide a band material, which may be produced in continuous lengths and be sold in bunches, and which, when being used, may be divided into suitable pieces without employing any special tools, and be given a suitable form on the spot by the person who is to use the band, and with a great variety of purposes. So, according to the invention, in connection with a plumber's work, or in connection with suspension of air-ducts, the band may be adapted in such a way that it may serve as a tube-bracket for the suspension of the tubing, or as suitable brackets, which are placed round the ducts for the suspension of same, and all this without using any special tools.

In this connection the band is used for providing that part of the bracket which is to be placed around the tubing or the duct respectively, but also for providing that part of it which is used as a strap (or suspension member) for the suspension of the duct in suitable hooks, provided at such places where the tubing or the duct is to be fastened.

In connection with other purposes of the invention the band may be used similarly. The person who applies the band, will cut off a piece, and without using any special tools he will shape the band in a manner suitable to the purpose.

According to the invention the band is, for this purpose, characterised therein that the band, which in a way known per se is perforated, is axially provided with spaced holes, and that the edges of said band are shaped in such a way, for instance, by giving the sides the shape of waves, that the cross-section of the band in its entire length will have substantially an equal stretching- and bending-resistance, for the purpose that the band, in spite of the perforations, may be suspended and bent, as if it were a band of equal thickness with parallel side-edges.

It is therefore seen that the invention provides a supporting member which comprises a strip that is disposable about a member to be supported and in which the strip has a longitudinal row of spaced perforations, the opposite longitudinal edges of the strip including surfaces extending respectively outwardly about one and inwardly toward the next adjacent perforation. There is thus provided a strip having alternating closely spaced enlarged perforated portions and narrow plain portions and the size of the perforations in the enlarged portions is of such relation to the width of the narrow portions as to provide constant transverse cross-sectional area of strip from end to end.

It is another object of the invention to provide very simple means for piecing together two band parts of the same description as those according to the invention, whereby two band-ends are being placed one on top of the other, and being joined together by means of a clip shaped substantially like a U, with a bottom-piece having the width equal to that of the narrowest part of the band, and with the two legs made in such a way that they may be bent round the two bands overlapping each other, and with the holes in one band exactly covering the holes in the other band. When bands according to the invention are to be pieced together, it may in some cases be of importance for the adjustment of the position of the holes relatively to each other, to join the pieces together in such a way that one overlapping portion has been axially displaced relatively to the other part. For the kind of piecing described here the present invention provides for a special device suitable for this purpose. Said device consists in a clip, which, in the first place, is shaped in such a way that it may be laid round the narrowest part of said band, the clip being provided with outwardly bent, coinciding, end portions, so adapted that they may be extended through the corresponding hole in the other band and be bent like an ordinary split-pin.

Further objects of the invention lie in special embodiments of suspension devices for tubings and ducts by using the band described above. A bracket of this kind for the suspension of tubings and ducts by means of a suspension strap, is, according to the invention, characterised therein that the bracket encompassing the tube or the duct, has been adapted, out of a suitable piece of the band, in such a way as to embrace the tube or the duct, and whereby an additional length of the band corresponding to two band pieces of a length equal to the distance between two holes, is bent side-ways in an outwardly direction in such a manner as to form lugs, through which a bolt may be inserted, or a securing device as the one described above for the joining together of the clip. At the same time the bracket may be provided with a strap (suspension member) in the shape of a band-piece of the same material, fastened to said lug, the free end of said strap serving to suspend the bracket in a suitable hook, either by inserting the hook in one of the holes in the strap, or by the strap being bent over in such manner that the hook may be inserted through two holes coinciding with each other, or by bending the strap in such a way that, through two coinciding holes, a bolt or a split-pin may be inserted in such manner that a loop is formed and whereby the strap may be placed on the suspension hook by putting the hook into said loop.

By way of illustration the invention will be described below and references be made to the accompanying drawing, which shows a few embodiments thereof.

Figure 1 illustrates a portion of the band according to the invention including clips associated therewith. Figures 2 and 3 illustrate different forms of a clip device used to join portions of the band together. Figures 4, 5, and 6 illustrate different embodiments of supporting members made in accordance with the invention.

In Fig. 1 is shown a portion of the band according to the invention. The part of the band illustrated on the drawing comprises two band portions 1 and 2 being joined together. Each of the band portions is provided with a row of holes 3 spaced with regular intervals. In those parts of the band where cross-sectionally the band has been weakened owing to the holes 3, said band has been provided with outwardly bent edges 4, in such manner that the cross-sections of the material along the line a—a and along the line b—b, and along any other line through the band, will have the same dimension, i. e. the same stretching- and bending-resistance.

In Fig. 2 is shown a clip suitable as a joining device for the band. Said device consists in a U-shaped part, the bottom part of which 5 corresponds to the width of the narrowest part of the band. Whenever two band portions are to be pieced together, one band part 1 is placed on top of band part 2, in such manner that they overlap each other, whereafter one, or more clips 5 are placed round the band, as shown in Fig. 1.

In Fig. 3 is shown, according to the invention, another kind of piecing device, consisting in a bottom-piece 6 with side-pieces (legs) 7 and 8, bent in such a way as to make a slit 9 of a shape suitable to be laid round the narrowest part of the band.

Furthermore, the piecing device may be adapted so as to make the "legs" 10 and 11 extend outwardly in the shape of a split-pin adapted to be put through the hole provided in the overlapping band-portion, in such a way that the two band pieces may be joined together displaced axially relatively to each other at a distance corresponding to half the distance between two holes 3.

In Figs. 4, 5 and 6 are shown three different embodiments of suitable brackets made of the band described according to the invention.

In Fig. 5 is shown a bracket to be used for the suspension of a cylindrical tube. Said bracket consists in a part, 12, bent so as to be given a circular shape of the band according to the invention. At the free ends the band has been bent outwardly in such a manner that lugs 13 and 14 are formed, which may be joined together by means of a bolt 15. A corresponding cut-off band-piece 16 may be inserted between the lugs 13 and 14 thus serving as suspension strap. At its free end the band-piece 16 may be bent downwardly at 17 in such manner that the suspension hook 18 may be inserted through two holes for the sake of strength.

In the embodiment illustrated in Fig. 6 the band has been given a form suitable as a suspension organ for a rectangular tube or a duct. In this case, according to the invention, the suspension strap 19 as well as the bracket proper 20, which is laid round the tube section, are made of one piece of the band described, one of the tubes 21, for the joining together of the band round the duct, has been extended so as to form the suspension strap 19. The other tube 22 is fastened to the suspension strap by means of a securing device as shown in Fig. 3. At its upper end the strap, in this case, has been bent downwards at 23 in such a way that a loop 24 is formed, adapted so as to be threaded in on to the hook 25, said loop being anchored by means of a clip 26 as shown in Fig. 2.

Fig. 4 illustrates still another embodiment of a suspension bracket for a tube or a duct. In this case the part 27, which is to be placed round the duct, is provided with lugs 28 and 29 bent inwardly, which, by means of a bolt 30, is fastened to the suspension strap 31, the which, at its free end has a downwardly bent part 32 so that the suspension hook 33 may pass through two holes.

From the preceding description and from the three last mentioned examples it will be evident what possibilities the band may have according to the invention. It is obvious that this new band material will provide the artisans with a band which may be used for the most variegated purposes, and that by this means the use of special brackets and special suspension devices or irons for packing purposes respectively, may be greatly reduced. Otherwise a great variety of bands would have been necessary in order to satisfy various needs which may arise in these special kinds of operations.

Furthermore, it will be evident that the band material according to the invention may be used for many other purposes not mentioned above, for example, as supporting brackets, joining connections, angle irons, and the like.

I claim:

A supporting member comprising a strip disposable about a member to be supported in supporting relation thereto, said strip having a longitudinal row of spaced perforations, the opposite longitudinal edges of the strip including surfaces extending respectively outwardly about one perforation and inwardly toward the next adjacent perforation, thereby providing a strip having alternating enlarged perforated portions and narrow plain portions and the size of the perforations in the enlarged portions bearing such relation to the width of the narrow portions as to provide constant transverse cross-sectional area of strip from end to end.

ERLING ANDREAS WOLD.

REFERENCES CITED

The following references are of record in the file of this patent:

UNITED STATES PATENTS

| Number | Name | Date |
|---|---|---|
| 1,086,442 | Cornelius | Feb. 10, 1914 |
| 1,804,472 | Leslie | May 12, 1931 |